United States Patent
Hatakeyama et al.

(10) Patent No.: US 7,268,958 B2
(45) Date of Patent: Sep. 11, 2007

(54) HOLDER AND OPTICAL ELEMENT

(75) Inventors: Shigeru Hatakeyama, Miyagi-ken (JP); Takehiko Tomisawa, Miyagi-ken (JP); Kazuhiro Konno, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 14 days.

(21) Appl. No.: 10/925,496

(22) Filed: Aug. 24, 2004

(65) Prior Publication Data

US 2005/0063074 A1    Mar. 24, 2005

(30) Foreign Application Priority Data

Aug. 25, 2003  (JP)  ............................. 2003-299861

(51) Int. Cl.
    *G02B 7/02*    (2006.01)
(52) U.S. Cl. ..................... 359/811; 359/808; 359/819
(58) Field of Classification Search ................ 359/808, 359/811, 819; 385/93
    See application file for complete search history.

(56) References Cited

U.S. PATENT DOCUMENTS

| | | | | |
|---|---|---|---|---|
| 4,281,891 A | * | 8/1981 | Shinohara et al. | ............ 385/33 |
| 4,895,585 A | * | 1/1990 | Angenent et al. | ............... 65/39 |
| 6,179,483 B1 | * | 1/2001 | Kanazawa | .................... 385/93 |
| 6,567,224 B2 | * | 5/2003 | Hatakeyama et al. | ....... 359/819 |
| 6,735,023 B2 | * | 5/2004 | Schunk | ........................ 359/808 |
| 6,793,406 B1 | * | 9/2004 | Edwards et al. | .............. 385/88 |
| 2002/0075573 A1 | * | 6/2002 | Kaneko et al. | ............. 359/739 |

* cited by examiner

*Primary Examiner*—Hung Dang
*Assistant Examiner*—Joseph Martinez
(74) *Attorney, Agent, or Firm*—Brinks Hofer Gilson & Lione

(57) ABSTRACT

A holder and optical element device includes a holder having a substantially cylindrical interior shape and an optical element fitted in the holder along an inner surface of the holder. The holder may have a step on the inner surface thereof. This step has a surface that is inclined downward and inward from the interior surface of the holder. The optical element may have a convex optical surface section on a surface thereof and a flat surface section around the optical surface section, the flat surface section being disposed on the downward-inclined surface. The optical element is disposed on the inner surface of the holder in such a manner that the step is in contact with the peripheral surface of the optical element.

19 Claims, 4 Drawing Sheets

HOLDER AND OPTICAL ELEMENT

This application claims the benefit of priority to Japanese Patent Application No.: 2003-299861, filed on Aug. 25, 2003, which is incorporated herein by reference.

BACKGROUND

The present application may relate to a holder and optical element device in which an optical element is integrated with a holder and a method for fabricating the same, and more particularly, to a holder and optical element device molded by pressing an optical element material disposed inside the holder.

BACKGROUND

Optical elements such as lenses for pick-up heads of CD players or lenses for collecting signal light in optical communications need to be mounted with high accuracy. Therefore, to achieve such high mounting accuracy, generally a holder and optical element device is mounted by adjusting the position thereof with a holder, as described in U.S. Pat. No. 6,567,224. This type of optical element device is formed by softening an optical element material disposed inside a cylindrical holder by heat, and press-molding the softened optical element material with a die. The optical element is in contact with the inner surface of the holder and thus integrated therewith.

Generally, an optical surface section having an optical function is disposed on a surface of the optical element and a flat surface section is disposed around the optical surface section. When the convex optical surface section is formed, an optical element material is pressed by a die having a concave optical-surface-molding section, which corresponds to the convex optical surface section, and a flat-surface-molding section, which corresponds to the flat surface section. The flat-surface-molding section presses the optical element material towards the center of the optical element. However, the optical-surface-molding section cannot be filled with a sufficient amount of the optical element material, resulting in a defect in the molded optical surface section.

SUMMARY

The present application describes a holder and optical element device having a precisely-formed convex optical surface section and a method for fabricating the same.

According to an aspect of the present application, a holder and optical element device includes a holder having a substantially cylindrical shape and having an inner surface and a step on the inner surface, the step having surface that may be inclined downward and inward from the inner surface and an optical element having a peripheral surface and fitted in the holder along the inner surface of the holder, the optical element having a top surface provided with a convex optical surface section and a flat surface section around the optical surface section, the flat surface section being disposed above the downward-inclined surface. In this holder and optical element device, the optical element is fitted in the holder such that the step is in contact with the peripheral surface of the optical element. Therefore, when press-molding the optical element with a die, part of the pressed optical element material is easily led toward the center and thus the optical-surface-molding section is filled with a sufficient amount of the optical element material. The flat surface section of the optical element may be inclined downward and outward with respect to the central axis thereof. The material of the optical element may be glass or resin or other transparent material with moldable properties.

In another aspect, a method for fabricating a holder and optical element device includes the steps of placing an optical element material inside a holder having a substantially cylindrical shape and pressing the optical element material by a molding surface of a die to form an optical element having a convex optical surface section, the optical element being in contact with an inner surface of the holder. In this method for fabricating a holder and optical element device, the midsection of the optical element material is pressed by a concave optical-surface-molding section in the molding surface, and a peripheral portion around the midsection of the optical element material is pressed inward and downward by a planar flat-surface-molding section that is inclined downward and outward. Therefore, part of the optical element material pressed by the flat-surface-molding section is easily led toward the center and thus the optical-surface-molding section is filled with a sufficient amount of the optical element material. According to another aspect of the method for fabricating a holder and optical element device, a step is provided on the inner surface of the holder, the step may include a surface that may inclined downward and inward from the inner surface, and when the optical element material is pressed by the die, the downward-inclined surface of the step and the flat-surface-molding section of the die face each other.

DETAILED DESCRIPTION

Exemplary embodiments of the invention may be better understood with reference to the drawings, but these embodiments are not intended to be of a limiting nature. Rather, the invention is to cover all modifications, equivalents, and alternatives falling within the spirit and scope of the invention which is set forth by the claims.

Figure 1:
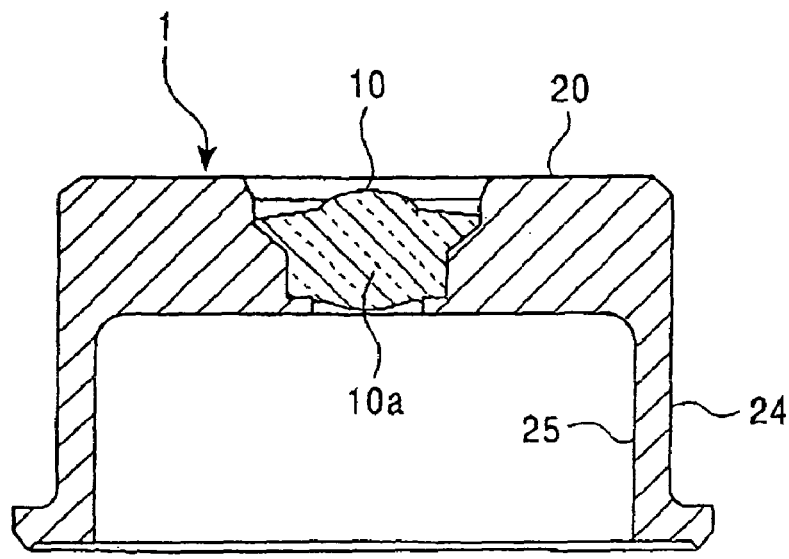
FIG. 1 is a cross-sectional view of a holder and optical element device according to an embodiment.
Figure 2:
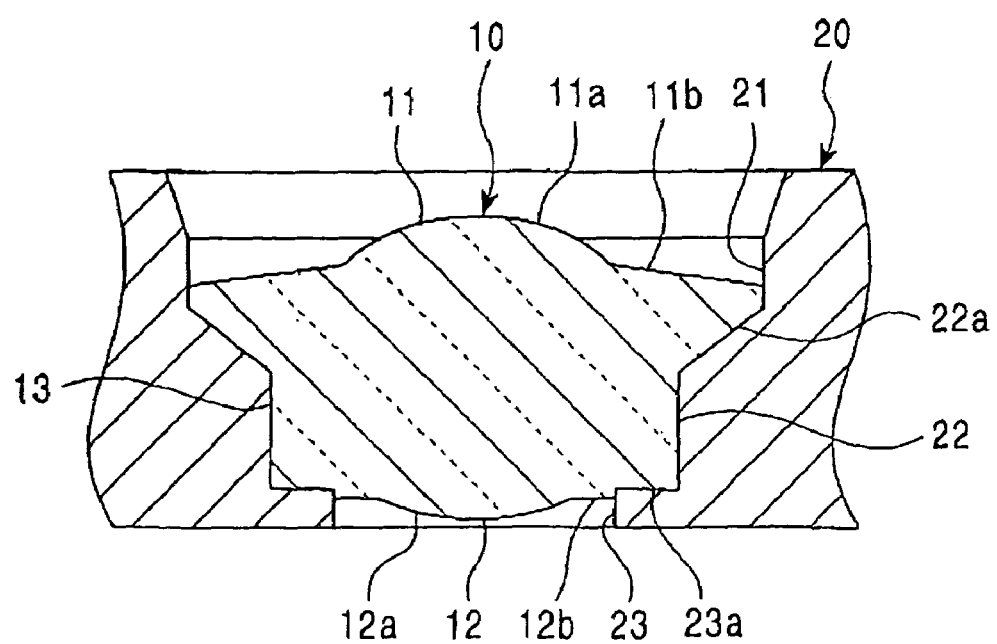
FIG. 2 is an enlarged cross-sectional view of the optical element shown in FIG. 1 and the peripheral portion thereof.
Figure 3:
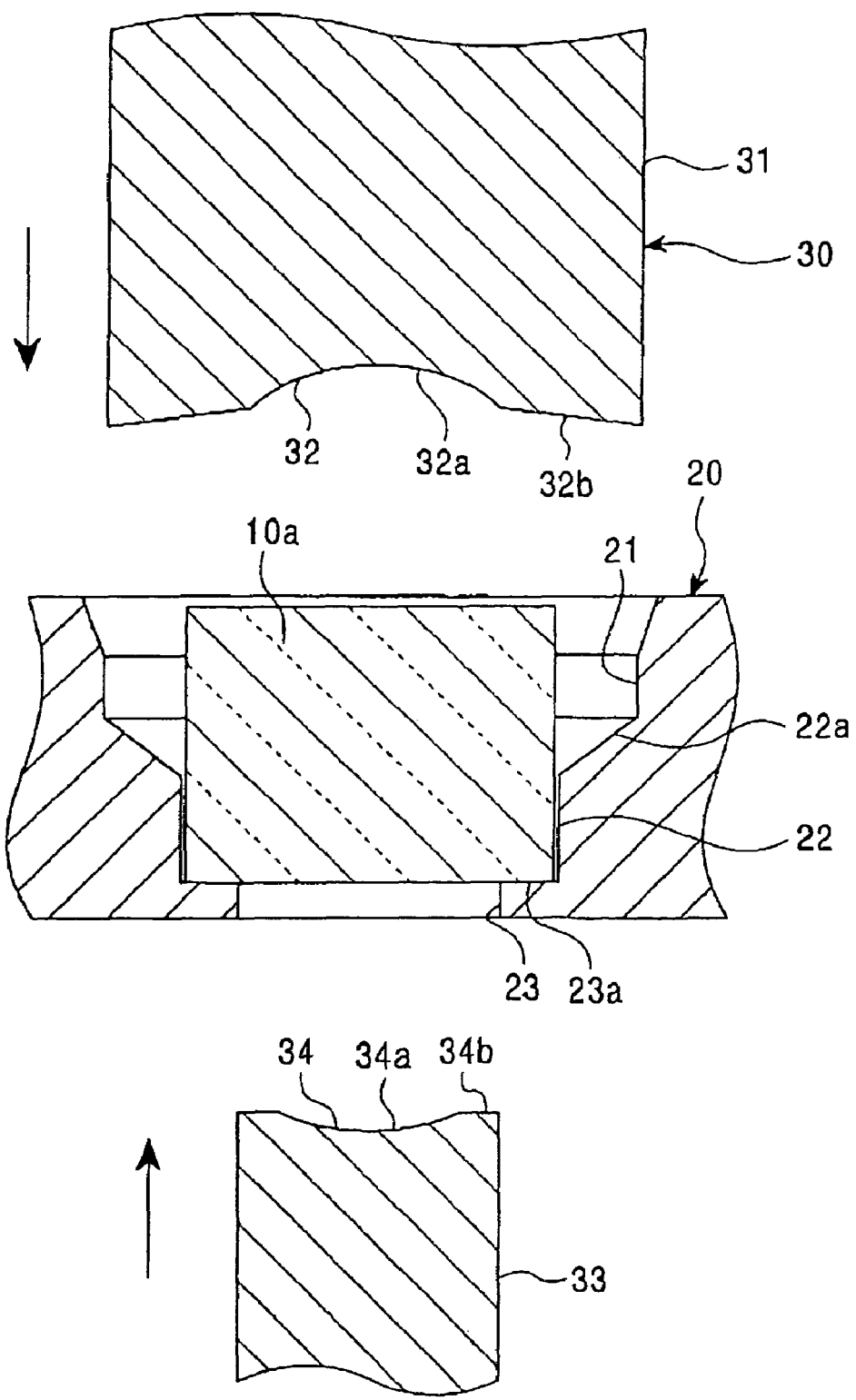
FIG. 3 is an enlarged cross-sectional view of the optical element and the peripheral portion thereof prior to press-molding.
Figure 4:
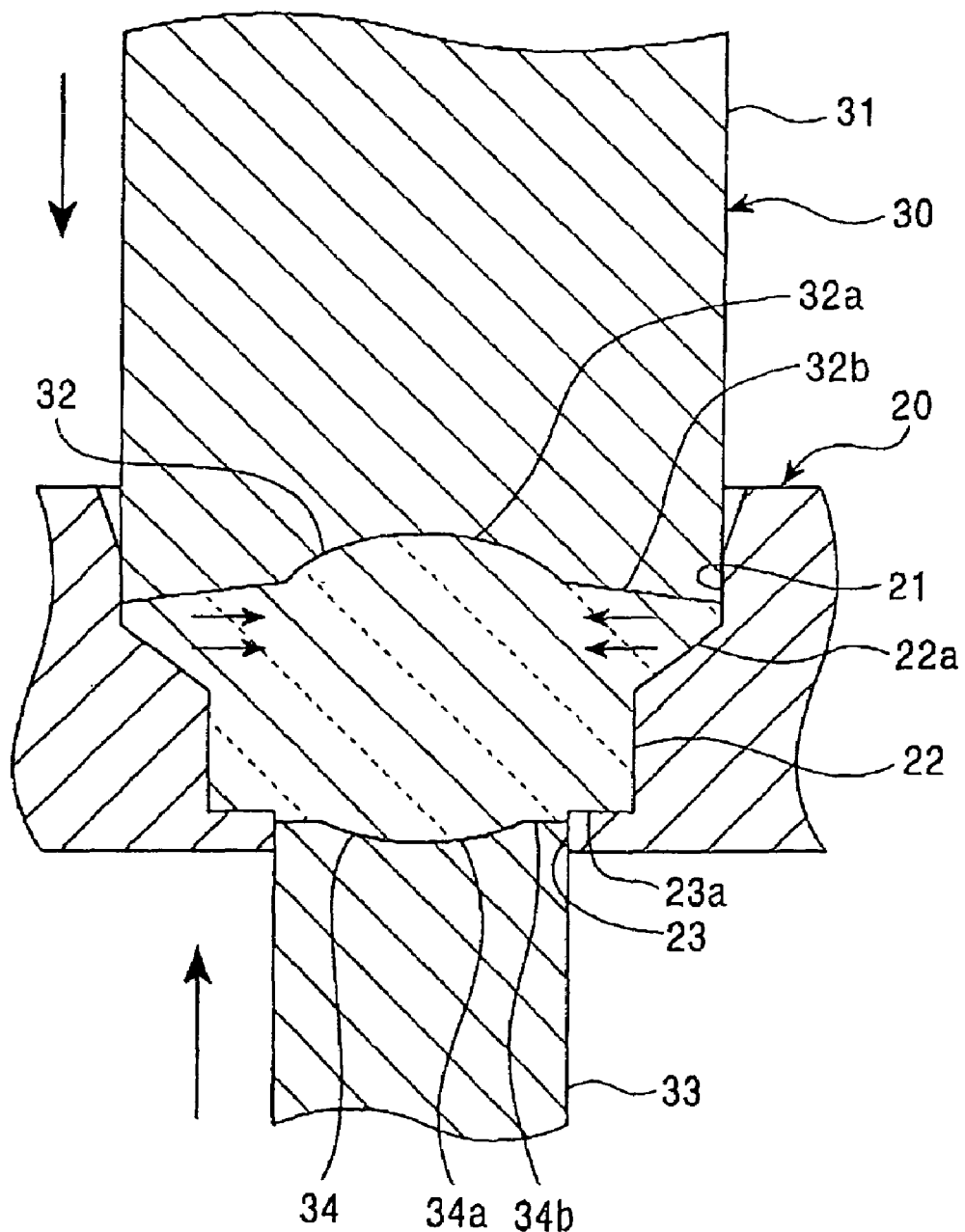
FIG. 4 is an enlarged cross-sectional view of the optical element and the peripheral portion thereof during press-molding.
Figure 5:
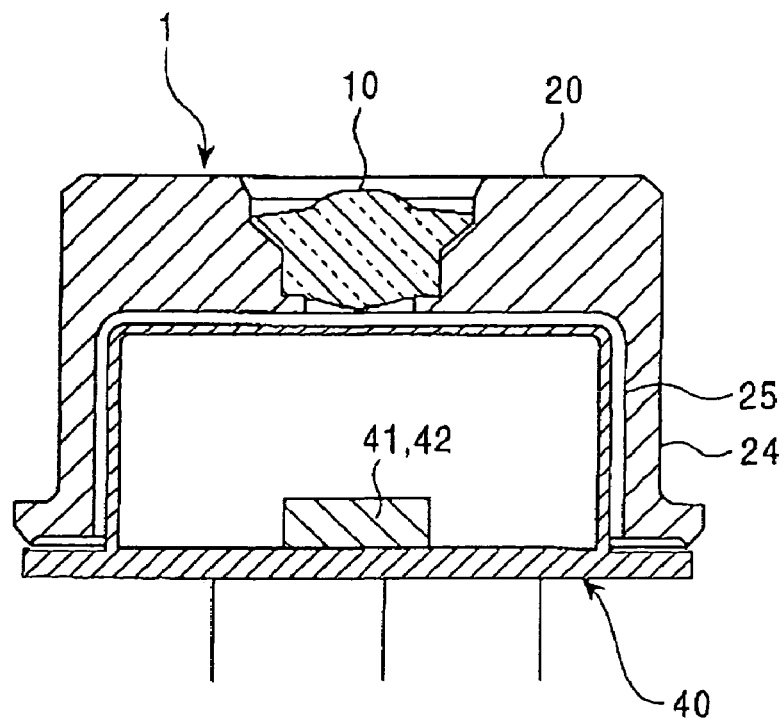
FIG. 5 is a cross-sectional view of the holder interfaced with a CAN-type optical element.

Like numbered elements in the same or different drawings perform equivalent functions The same elements or parts throughout the figures of the drawings are designated by the same reference characters. FIG. 1 is a cross-sectional view of a holder and optical element device according to an embodiment of the present invention. FIG. 2 is an enlarged cross-sectional view of the holder and optical element device shown in FIG. 1 and the peripheral portion thereof. FIG. 3 is an enlarged cross-sectional view of the holder and optical element device and the peripheral portion thereof prior to press-molding. FIG. 4 is an enlarged cross-sectional view of the holder and optical element device and the peripheral portion thereof during press-molding. FIG. 5 is a cross-sectional view of the holder and optical element device and a relationship to a CAN-type optical device.

A holder and optical element device 1 may be attached to an optical device ("second optical device") such as a laser diode 41 or photodiode 42 of a CAN type 40, or other package type. The holder and optical element device 1 includes an optical element 10 and a holder 20, as shown in FIG. 1. The optical element 10 refracts light emitted from a first optical device (not shown) and converges light towards a second optical device 40 (FIG. 5). The holder 20 supports the optical element 10 and determines the position of the optical element 10 with respect to second optical device 40. In the following description, "below" or "lower" denotes the direction from the second optical device to the optical element and "above" or "upper" denotes the direction from the optical element to a first optical device. It should be appreciated that the first and second optical devices may be either sources, detectors, or modifiers of light energy, depending on the use of the holder and optical element.

Referring to FIG. 2, the optical element 10 is fixed in the holder 20 such that a peripheral surface 13 of the optical element 10 is in contact with an inner surface 21 of the holder 20. The optical element 10 has an upper surface 11 and a lower surface 12, which are externally exposed, and a convex optical surface section 11a and a convex optical surface section 12a are disposed on the upper surface 11 and the lower surface 12, respectively. The optical surface section 11a and the optical surface section 12a may be aspheric and refract light emitted from the first optical device and converge light toward the second optical device. A flat surface section 11b is disposed around the optical surface section 11a and is inclined downward and outward. A flat surface section 12b is disposed around the optical surface section 12a.

As shown in FIGS. 1 and 2, the optical element 10 is disposed in the holder 20 with a substantially cylindrical shape so as to be in contact with the inner surface 21 of the holder 20. A step 22 is disposed on the inner surface 21 of the holder 20 and is provided with a surface 22a that is inclined downward and inward. This downward-inclined surface 22a guides an optical element material 10a toward the center when press-molding the optical element 10. A flat holding section 23 protrudes inwardly from the bottom end of the inner surface 21 and forms an opening slightly larger than the optical surface section 12a of the lower surface 12. The holding section 23 has a holding surface 23a, and the optical element material 10a is placed on the holding surface 23a in press-molding the optical element 10.

The holder 20 is provided with an attachment section 24, whose shape may be independent of the exterior shape of the holder and serve to adapt the holder and the inner surface 25 of the attachment section to mate with the dimensional characteristics of the second optical device (FIG. 5). The attachment section 24 may extend substantially perpendicularly in the downward direction from the top edge of the holder 20 and has an inner surface shape 25 that may correspond to that of the side surface or a portion thereof, of the second optical device 40. The inner surface 25 of the attachment section 24 may mate with a surface of the optical device, and the bottom surface of the holder 20 may abut the surface of the optical device. Therefore, the holder 20 may be attached to the second optical device and the optical element 10 is may be aligned to the second optical device. The holder 20 may be affixed to the second optical element.

The optical element 10 is disposed in the holder 20 so as to be in contact with the inner surface 21 of the holder 20. More specifically, the upper surface 11 of the optical element 10 is slightly higher than the step 22, whereas the lower surface 12 of the optical element 10 is slightly lower than the holding surface 23a. The peripheral surface 13 of the optical element 10 is in contact with the step 22 and the holding surface 23a, as shown in FIG. 2. The flat surface section 11b of the optical element 10 is disposed above the downward-inclined surface 22a of the step 22. In other words, the flat surface section 11b and the downward-inclined surface 22a have slopes in the vertical direction.

In another aspect, a method for fabricating the holder and optical element device 1 is described. The optical element material 10a for forming the optical element 10 and the holder 20 for accommodating the optical element material 10a are prepared. The optical element material 10a may be comprised of optical glass or resin and have a cylindrical column shape. The cylindrical optical element material 10a has a radius that is large enough for the optical element material 10a to be placed on the holding section 23 of the holder 20. The optical element material 10a has a volume sufficient to form the optical element 10. The holder 20 is formed by cutting or casting, for example, aluminum or stainless steel.

As shown in FIG. 3, the optical element material 10a is placed on the holding surface 23a of the holder 20 and may then be heated, thereby softening the optical element material 10a. Subsequently, as shown in FIG. 4, the softened optical element material 10a is press-molded with a die 30 consisting of an upper die 31 and a lower die 33. The bottom surface of the upper die 31 is a molding surface 32 and the top surface of the lower die 33 is a molding surface 34. The molding surface 32 includes an optical-surface-molding section 32a corresponding to the optical surface section 11a and a flat-surface-molding section 32b corresponding to the flat surface section 11b. The molding surface 34 includes an optical-surface-molding section 34a corresponding to the optical surface section 12a and a flat-surface-molding section 34b corresponding to the flat surface section 12b. The optical-surface-molding section 32a and the optical-surface-molding section 34a press the midsection of the optical element material 10a, thereby forming the optical surface section 11a and the optical surface section 12a. The flat-surface-molding section 32b and the flat-surface-molding section 34b press the peripheral portions of the optical element material 10a, thereby forming the flat surface section 11b and the flat surface section 12b. The flat-surface-molding section 32b in the upper die 31 is inclined downward and outward. Therefore, in the press-molding with the upper die 31, part of the optical element material 10a may be pressed inward and downward by the flat-surface-molding section 32b and thus led toward the center. Accordingly, the optical-surface-molding section 32a and the optical-surface-molding section 34a are filled with a sufficient amount of the optical element material 10a. In an aspect, only the flat-surface-molding section 32b in the upper die 31 may be inclined. Alternatively, the flat-surface-molding section 34b in the lower die 33 may also be inclined.

The step 22 with the downward-inclined surface 22a is disposed on the inner surface 21 of the holder 20. When the optical element material 10a is press-molded, the flat surface-molding section 32b of the upper die 31 and the downward-inclined surface 22a face each other. Therefore, part of the optical element material 10a pressed by the flat-surface-molding section 32b may be readily led toward the center by the downward-inclined surface 22a. Thus, the optical-surface-molding section 32a and the optical-surface-molding section 34a, which form the convex optical surface sections 11a and 12a, respectively, are sufficiently filled with the optical element material 10a.

Figure 6:
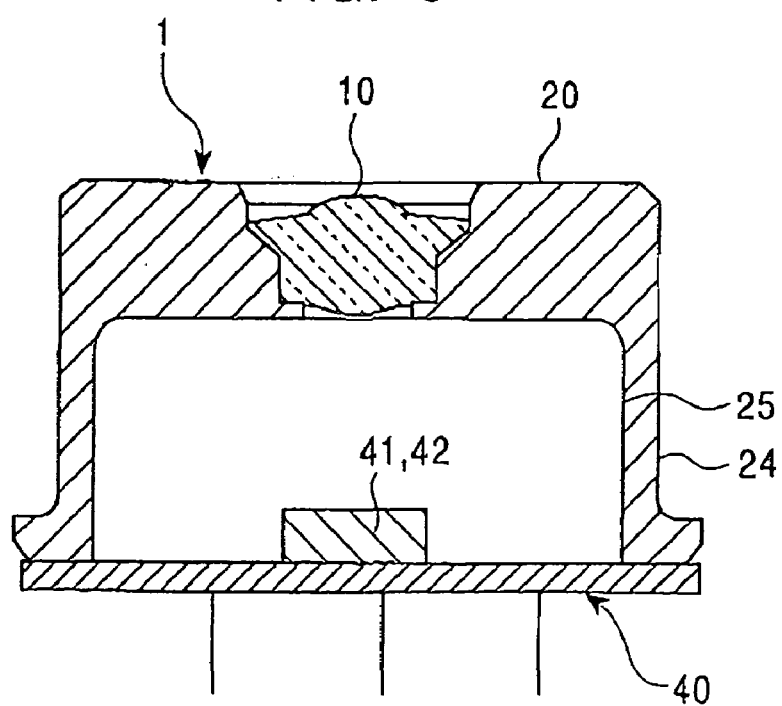
FIG. 6 is a cross sectional view of the holder covering a laser diode or photodiode.

The holder and optical element device may attached to an optical device of a CAN type. However, the holder and optical element device of the present invention is not limited to the ones described above and the shape of the holder and optical element device may be modified depending on the shape of the optical device to which the holder and optical element device is attached. For example, in place of the attachment section with a cylindrical column shape, a support member may support the holder. Furthermore, as shown in FIG. 6, the attachment section 24 may directly cover the laser diode 41 and the photodiode 42. Furthermore, in the above embodiments, the optical element has the convex optical surface sections on both surfaces thereof but may have a single convex optical surface section on either surface.

Although only a few exemplary embodiments of this
What is claimed is:

1. A holder and optical element device comprising:
a holder having an inner surface comprising an aperture of substantially cylindrical shape extending between opposing surfaces of the holder, and a step on the inner surface, the step having a surface that is inclined downward and inward from the inner surface of the holder; and
an optical element having a peripheral surface and fitted to the inner surface of the holder, the optical element having a surface provided with a convex optical surface section and a flat surface section around the optical surface section, the flat surface section being inclined downward and outward so as to contact the inner surface and disposed between the opposing surfaces of the holder,
wherein the optical element is fitted in the holder such that the step is in contact with the peripheral surface of the optical element.

2. A holder and optical element device comprising:
a holder having an inner surface comprising an aperture of substantially cylindrical shape extending between opposing surfaces of the holder, and a step on the inner surface, the step having a surface that is inclined downward and inward from the inner surface of the holder, a minimum diameter of the step being greater than a minimum diameter of the aperture; and
an optical element having a peripheral surface and fitted to the inner surface of the holder, the optical element having a surface provided with a convex optical surface section and a flat surface section around the optical surface section, the flat surface section being disposed above the downward-inclined step surface,
wherein the optical element is fitted in the holder such that the step is in contact with the peripheral surface of the optical element
wherein the flat surface section of the optical element is inclined downward and outward.

3. A device comprising:
a holder having a substantially cylindrical aperture extending between an upper surface and a lower surface of the holder, the aperture having a surface with a step thereon, the step projecting inward from the surface, disposed between the upper and lower holder surfaces, and having a surface inclined downward with respect to the upper holder surface;
an optically transmissive element having a peripheral surface fitted into the aperture, in contact with at least part of the aperture surface, including the step surface thereof; the optically transmissive element having a first surface provided with a flat surface portion facing towards the upper holder surface and inclined downward and outward so as to contact the aperture surface.

4. The device according to claim 3, wherein at least one surface of the optically transmissive element has a concave portion disposed such that the concave portion is surrounded by the flat surface portion.

5. The device according to claim 3, wherein a second surface of the optically transmissive element is opposed to the first surface, and has a flat surface portion.

6. The device according to claim 5, wherein the second surface has a concave portion such that the concave portion is surrounded by the flat surface portion.

7. The device according to claim 5, wherein the holder has an attachment portion adapted to interface with an optical device, such that at least one of the first and second surfaces opposes the optical device.

8. The device according to claim 7, wherein the optical device is housed in a can.

9. The device according to claim 8, wherein the optical device is a laser.

10. The device according to claim 8, wherein the optical device is an optical photodetector.

11. The device according to claim 8, wherein the attachment portion is sized such that an interference fit exists with respect to the optical device.

12. The device according to claim 7, wherein the attachment portion is connected to the optical device with an adhesive material.

13. The device according to claim 3, wherein the optically transmissive element comprises a glass.

14. The device according to claim 3, wherein the optically transmissive element comprises a resin.

15. A holder having a substantially cylindrical aperture extending between an upper surface and a lower surface of the holder, the aperture having a surface with a step thereon, the step projecting inward from the surface, disposed between the upper and lower holder surfaces, and having a surface inclined downward with respect to the upper holder surface;
an optically transmissive element having a peripheral surface fitted into the aperture, in contact with at least part of the aperture surface, including the step surface thereof; the optically transmissive element having a first surface provided with a flat surface portion, the flat surface portion being disposed above the step and facing towards the upper holder surface
wherein the flat surface portion is inclined upward and inward from the aperture surface, and a minimum diameter of the step is greater than a minimum diameter of the aperture.

16. A holder for an optical element, comprising:
a metallic object, having a substantially circular aperture disposed between an upper surface and a lower surface of the object, the aperture having a surface with a step deformation, the step being formed between the upper and lower surface of the object, and having a slope from the aperture surface which is inclined towards the object lower surface wherein the optical element is disposed between the upper surface and the lower surface of the object; and
wherein a minimum diameter of the step is greater than a minimum diameter of the aperture.

17. The holder according to claim 16, comprising a holding section disposed adjacent the lower surface of the object.

18. The holder according to claim 17, wherein the holding section comprises a holding surface in contact with the optical element.

19. The holder according to claim 16, wherein the holding section protrudes inward from an inner surface of the object.

* * * * *